United States Patent [19]

Kennedy

[11] Patent Number: 5,771,018
[45] Date of Patent: Jun. 23, 1998

[54] HAND-HELD NAVIGATION RADIO WITH CDI FOR VOR AND LOCALIZER

[75] Inventor: Stuart B. Kennedy, Batavia, Ohio

[73] Assignee: Sportman's Market, Inc., Batavia, Ohio

[21] Appl. No.: 768,531

[22] Filed: Dec. 18, 1996

Related U.S. Application Data

[60] Provisional application No. 60/009,825 Jan. 16, 1996.
[51] Int. Cl.[6] .................................................. G01S 5/02
[52] U.S. Cl. ............................................................ 342/419
[58] Field of Search ............................... 342/49, 404, 419, 342/451, 357; 701/208, 215, 218, 207

[56] References Cited

U.S. PATENT DOCUMENTS 4,843,399  6/1989  Bongiorno et al. .

OTHER PUBLICATIONS

Copy of Instruction Manual for sporty's A300 Transceiver (©1989) (no month).

Primary Examiner—William L. Oen
Attorney, Agent, or Firm—Wood, Herron & Evans LLP

[57] ABSTRACT

A hand-held navigation radio transceiver for voice communications is provided with dual CDI capability by which to display degrees off the radial in response to VOR signals and deviation from the localizer beam track in response to localizer signals. The display is a graphical representation corresponding to traditional deflecting-needle CDI meters.

12 Claims, 2 Drawing Sheets

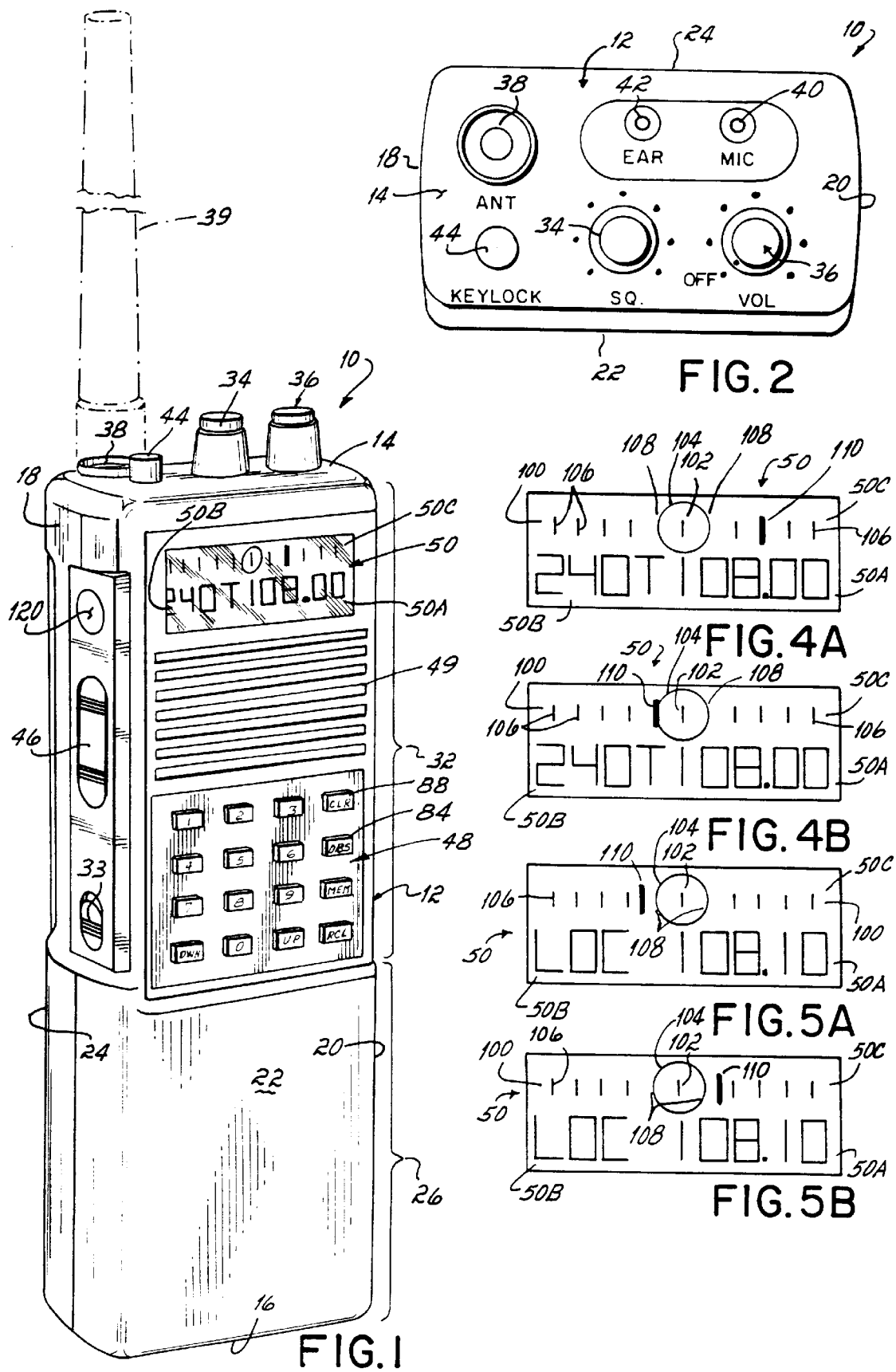

HAND-HELD NAVIGATION RADIO WITH CDI FOR VOR AND LOCALIZER

This application is a continuation of provisional application number 60/009,825 filed Jan. 16, 1996.

BACKGROUND OF THE INVENTION

I. Field of the Invention

The present invention relates to radio receivers and transceivers and, more particularly, to "navigation radios" adapted to provide pilots with course deviation indication (CDI) and more particularly to such radios adapted to provide CDI responsive to both VOR signals and localizer signals.

II. Description of Prior Art

Many aircraft are equipped with panel-mounted radio transceivers by which to communicate with control towers, other aircraft, and the like in the COMM frequency range (118.000 MHz to 136.975 MHz) of the aviation airband. Such radios may also receive signals in the NAV frequency range (108.000 MHz to 117.950 MHz) of the aviation airband by which to provide certain navigational functions useful in instrument flight. These radios are known as "nav-comms". One important navigational function that such radios can provide is an indication of course deviation, or "CDI," from a predetermined path.

Course deviation indicators ("CDI") have been traditionally employed by aircraft pilots for two purposes. During flight, a pilot can utilize a nationwide network of electronic references to navigate the aircraft. The nationwide network includes a plurality of stations, each of which transmits radial signals at a selected one of a group of RF frequencies (VOR frequencies) in the NAV range of the airband. These signals are broadcast 360 degrees around the station with a distinctive signature for each degree radial. The pilot tunes the aircraft navigation radio to a VOR frequency assigned to a particular reference location. The radio detects the VOR signals from that reference and utilizes the VOR signals to inform the pilot of the radial the aircraft is on, to or from, the reference location. The pilot may thus learn the bearing to fly relative to or from the reference location.

Typically, a nav "head" is connected to the navigational function of the radio and is mounted on the aircraft panel. The head has an Omni Bearing Selector ("OBS") dial to indicate radial, a deflectable needle and a to/from indicator. The deflection of the needle from dead center (after initial manual OBS orientation) corresponds to the number of proximate degrees that the aircraft has deviated (i.e., CDI) left or right of the radial or path selected by the pilot on the OBS dial. Thus, if the pilot desires to fly a certain path defined by a radial from a fixed electronic reference location, the pilot tunes the nav radio to the frequency of that reference, sets the OBS to the desired radial and turns or flies the plane in the appropriate direction until the CDI needle is centered. Deviations from the desired radial or path are indicated by the deflecting needle. Alternatively, the pilot selects the desired VOR station frequency and turns the OBS dial until the needle is centered and a "to" or "from" indicator shows in the head. The pilot can then determine which radial the aircraft is on relative to the station, as well as which reciprocal heading to take on that radial either to or from the station. Some nav heads include digital displays such that the pilot may be informed by a readout which directly displays the number of the radial, a letter, digit or symbol to indicate to or from (e.g., a "T" or an "F") and a graphic representation of a "head" and its deflectable needle to provide CDI.

A second use of a CDI is in connection with guiding an aircraft onto a runway. For this purpose, localizer signals are emitted from a reference point generally relative to the runway. The localizer signal is at another selected RF frequency (localizer frequency) in the NAV range of the airband. In the case of a localizer signal, the navigation radio is tuned to the assigned localizer frequency for that runway. When the radio is tuned to a localizer frequency, as contrasted to a VOR frequency range, the OBS dial is rendered ineffective. There is only one radial or "path" broadcast by the localizer reference, and that is a path which is generally aligned with, or only slightly misaligned from the airport runway. Localizer navigation is thus somewhat similar in many respects to VOR navigation, but in other respects is significantly different.

The detected localizer signals are utilized to inform the pilot of the location of the set, single localizer track to the runway. This information is displayed on a head (typically the same VOR head as discussed above). The deflection of the needle indicates whether the aircraft is to the left or the right of the predetermined localizer track and by how many proximate degrees, i.e., CDI.

Many aircraft may have two or more panel-mounted navigation radios, each with a VOR head, both capable of also handling localizer frequency inputs from the respective navigational radios. However, in some cases, panel mounted radios are not always conveniently located or may not work. In a worst case scenario, the radios may work initially, but fail during an instrument (IFR) flight, depriving the pilot of critical navigational information. Consequently, a pilot can be left in a dangerous situation.

Moreover, many general aviation aircraft may not be equipped with any panel mounted or other navigational radio. The pilot of such an aircraft is limited to visual (VFR) flight only and is thus deprived of the use of the VOR navigational system for normal flight. If the pilot blunders into an IFR flight environment, especially when there is no visual contact with the ground, a very dangerous situation results.

A significant safety advance was made for general aviation pilots with the introduction of hand-held transceiver radios adapted to operate in the COMM frequency range of the aviation airband. With such radios, pilots are able to communicate, even when no panel mounted radio is provided, and may receive radar-assisted vectoring. Some hand-held radios have been further adapted to receive signals in the NAV frequency range to provide some limited navigational features. In particular, some of these radios are designed to provide a CDI responsive to VOR signals. Unfortunately, prior hand-held navigation radios have apparently not been adapted to provide a wider range of navigation tools and, most notably, have not provided useful CDI information in response to localizer signals. At best, some hand-held radios have merely indicated on a display panel that the selected airband frequency is indeed a localizer frequency, but without providing any localizer information to the pilot with reference to the position of the plane relative to the localizer track or beam. Thus, it is believed that there is a need for a hand-held navigation radio adapted to provide dual CDI capability for both VOR and localizer signals, respectively.

SUMMARY OF THE INVENTION

The present invention provides a radio which is hand-held yet provides meaningful CDI information to a pilot in response both to VOR signals and to localizer signals. To this end, and in accordance with the principles of the present invention, the tuning circuitry of a hand-held navigation radio is responsive to selected aviation airband frequencies for receiving radial information when tuned to a VOR frequency and localizer track information when tuned to a localizer frequency. The radio further includes a display showing the bearing or localizer information as CDI in a graphical manner. The pilot may quickly ascertain the specifics of the degrees off from the radial or deviation from the localizer track, respectively, to thus provide the needed dual CDI capability.

In a preferred embodiment of the invention, the graphical representation of the display is in the form of a horizontal bar chart. The center line may be used to represent a nominal position. To each side of the center line are further lines or bars, each corresponding to a predetermined angular (degrees) departure from the nominal. An indicator appears in relation to the center and other lines to indicate either degrees off of the radial for VOR signals or degrees off of the localizer beam track for localizer signals, respectively. The position indicator thus simulates needle deflection for either incoming VOR or localizer radio signals. In a further preferred embodiment of the invention, an electronic OBS function is provided to select a radial when receiving VOR signals but which is disabled or bypassed when receiving localizer signals, for example, to thus further simulate operation of a panel-mounted nav head.

By virtue of the foregoing, there is thus provided a hand-held transceiver that also functions as a navigation radio to provide useful CDI information to a pilot responsive to either VOR frequency signals or localizer frequency signals without the need to resort to panel-mounted radios, or as a backup to such panel-mounted radios. For the first time, pilots may now have a complete hand-held navigational radio providing communication capability as well as CDI for both the VOR and the localizer systems.

These and other objects and advantages of the present invention shall become apparent from the accompanying drawings and the detailed descriptions thereof.

BRIEF DESCRIPTION OF THE DRAWINGS

The accompanying drawings, which are incorporated in and constitute a part of this specification, illustrate an embodiment of the invention and, together with a general description of the invention given above, and the detailed description given below, serve to explain the principles of the invention.

FIG. 1 is a perspective view of a hand-held navigation radio incorporating the features of the present invention;

FIG. 2 is a top view of the radio of FIG. 1;

FIGS. 4A and 4B are plan views of the display carried by the radio of FIG. 1 for purposes of illustrating utility of the radio in connection with reception of VOR signals; and FIGS. 5A and 5B are plan views of the display carried by the radio of FIG. 1 for purposes of illustrating utility of the radio in connection with reception of localizer signals.

DETAILED DESCRIPTION OF THE DRAWINGS

Figure 3:
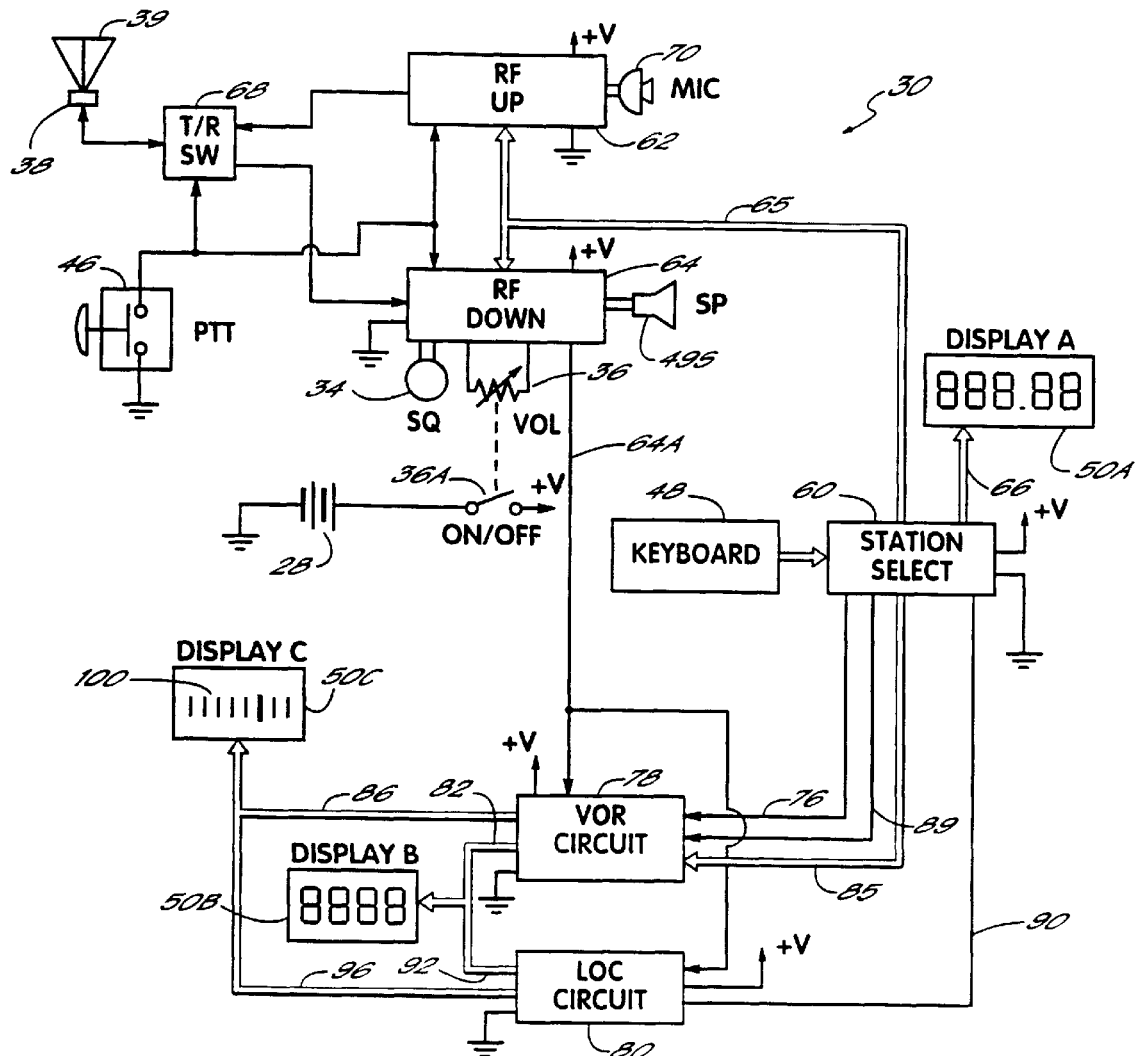
FIG. 3 is a schematic of an electronic circuit embodiment for the radio of FIG. 1.

With reference to FIG. 1 there is shown a hand-held navigation radio 10 incorporating the dual CDI capability of the present invention. To this end, radio 10 is self-contained in a housing 12 sized to fit comfortably in one hand of an average adult while radio 10 is in use. By way of example, housing 12 may be about 7 to 8 inches in height (from top wall 14 to bottom wall 16), 2 to 3 inches in width (from left wall 18 to right wall 20) and 1 to 2 inches in depth (from front face 22 to back face 24). The lower half 26 of housing 12 contains a removable battery pack 28 (e.g., containing eight AA Alkaline batteries) to power operating circuitry 30 (see FIG. 2) of radio 10 contained within the upper half 32 of housing 12. Battery housing portion 26 is disconnected from upper radio housing portion 32 by actuation of release button 33 on left wall 18. Squelch and volume controls 34, 36 are carried on top wall 14 along with a BNC antenna connector or jack 38 to receive an antenna as shown in phantom at 39 or a cable (not shown) to couple to an aircraft antenna (also not shown). Volume control 36 may also include an integral on/off switch 36A (see FIG. 3) for selectively connecting battery pack 28 to circuitry 30 such as via one or more voltage regulators (not shown) as is conventional. Microphone and earphone jacks 40, 42 may also be provided along top wall 14 along with a key lock button 44. Carried along left wall 18 is a push-to-talk ("PTT") button 46 to facilitate communication in the COMM range of the aviation airband frequencies in known manner. Finally, carried along front face 22 in upper housing portion 32 are keyboard 48, speaker port 49 and display or screen 50. The above-mentioned items all form operative portions of radio circuitry 30 to provide conventional tuning and operation of radio 10 for communication in the aviation airband COMM frequency spectrum as is well known.

To this end, and with reference to FIG. 3, keyboard 48 is used to key in a desired airband frequency such as by sequentially keying in the first five digits of the desired channel. Station select circuit 60 is operatively connected to keyboard 48 to accept the keyed-in sequence. Circuit 60 is designed to select the appropriate sixth digit (either 0 or 5 KHz) based on the known 25 KHz station to station separation in the aviation airband. In response to the numbers from keyboard 48, circuit 60 provides digital signals to RF UP and RF DOWN circuitry 62, 64, respectively, over lines 65 to control their operation. Circuit 60 also provides driving signals to a portion 50A of display 50 over lines 66 by which to digitally display the actual frequency or channel to which radio 10 is tuned. When the push-to-talk or PTT switch 46 is not actuated, which is the normal state of switch 46, T/R switch 68 is in a first state such that antenna jack 38 is electronically coupled through switch 68 to RF DOWN circuit 64. In this state of PTT switch 46, RF UP circuit 62 is not electronically coupled to jack 38. RF DOWN circuit 64 includes the necessary circuitry including, for example, a phase locked loop (PLL) circuit (not shown) to demodulate the selected RF frequency signals from antenna jack 38 down to audio level where they are reproduced at speaker 49S to be heard by the user via speaker port 49. The audio signals are also coupled to earphone jack 42 for listening via an earphone (not shown). To this end, RF DOWN circuit 64 is responsive to the digital signals from station select 60 so as to properly demodulate the selected airband signal. Squelch 34 and volume 36 controls operatively interconnect with RF DOWN circuit 64 to operate in conventional fashion.

When push-to-talk switch 46 is actuated, RF DOWN circuit 64 is electronically disconnected from antenna jack 38. Instead, T/R switch 68 assumes a second state in which the signals from RF UP circuit 62 are communicated to antenna jack 38 for radiation as RF radio signals. For this purpose, RF UP circuit 62 includes circuitry, such as a PLL or a VCO (both not shown), the latter of which may utilize the PLL of circuit 64, to modulate signals at the selected RF frequency as instructed by station select circuit 60. Consequently, audio signals provided through microphone 70 such as may be accessible through speaker port 49 on front wall 22 of housing 12 (or audio signals via microphone jack 40) are modulated to an RF frequency in the aviation airband as selected at keyboard 48. The modulated signals are then coupled through T/R switch 68 to antenna jack 38 for transmission.

The foregoing is a general description of conventional operation of a navigation radio transceiver.

In accordance with a principal feature of the present invention, radio 10 is adapted to provide dual CDI capability so that it may function as a useful navigational tool for pilots. To this end, audio signals demodulated by RF DOWN circuit 64 are coupled to VOR circuit 78 and LOC circuit 80 over lines 64A for purposes now to be described. With respect to VOR signals, when the frequency selected at keyboard 48 is recognized by station select 60 as a VOR frequency signal, a VOR enable signal is coupled from station select 60 via line 76 to VOR circuit 78. The VOR enable signal is not provided when radio 10 is not tuned to a VOR frequency. Upon initial receipt of VOR signals, the audio signals from RF DOWN circuit on lines 64A are examined by VOR circuit 78. If they contain information from which the current radial may be determined, VOR circuit 78 computes that radial and couples it via lines 82 to another portion 50B of display 50 whereat the radial is shown as a three digit number along with a "T" or an "F" to indicate to or from. OBS key 84 of keyboard 48 may be utilized to change the displayed radial. To this end, upon actuation of OBS key 84, the next three digits sequentially selected at keyboard 48 will be accepted by station select 60 as a radial number. When the radial is keyed in at keyboard 48 after OBS key 84 has been activated, the signals on line 65 are not necessarily altered. Rather, station select 60 provides a further set of digital signals over lines 85 representing the selected radial for utilization by VOR circuit 78. Digital signals 85 are utilized in conjunction with the demodulated audio signal over line 64A from RF DOWN circuit 64 tuned to the VOR frequency to compute the degrees off the radial selected at keyboard 48. Also, the signals on lines 82 are altered to cause display portion 50B to display the selected radial. VOR circuit 78 computes the degrees from radial in convention manner and outputs that information as CDI data on lines 86 coupled to a further portion, 50C, of display 50 to display the VOR bearing CDI information as will be hereinafter described. When in receipt of a VOR signal, actuation of the clear key 88 causes a signal to be coupled to VOR circuit 78 via line 89 to change the polarity of the radial. Thus, if the radial is 240 degrees "to", actuation of the clear key 88 would invert that to be 60 degrees "from", as is conventional.

On the other hand, when the frequency selected at keyboard 48 corresponds to a localizer frequency, station select 60 outputs an LOC enable signal on line 90 to activate localizer circuit 80. As with the VOR enable signal, the LOC enable signal is not provided when radio 10 is tuned to other than a localizer frequency. Thus, only when on a VOR frequency or a localizer frequency, respectively, will a respective VOR enable signal (76) or LOC enable signal (90) be provided. Upon receipt of the LOC enable signal, LOC circuit 80 examines the demodulated audio signal on line 64A. If the demodulated audio is a lozalizer signal, circuit 80 outputs digital signals corresponding to the letters LOC over lines 92 to display portion 50B causing the display to show the letters "LOC" indicating to the pilot that a localizer signal is being received. Also, the demodulated signals from RF DOWN circuit 64 coupled to circuit 80 via lines 64A are utilized by LOC circuit 80 to compute deviation from the localizer beam track in conventional manner. That information is output as CDI data over lines 96 to the same display portion 50C which displayed VOR bearing CDI data to now display localizer track CDI deviation. Also, when a localizer signal is being received, actuation of OBS key 84 will be ignored by station select circuit 60 thus simulating the disabling of an OBS dial on a "nav-head" when the radio receives a localizer signal.

It will be seen from the foregoing that display 50 provides information which shows not only the airband frequency to which radio 10 is tuned, but also CDI for both VOR and localizer purposes. As a consequence, radio 10 is capable of typical communication transceiver functions but also nav radio functions with dual CDI capability. Operation of display 50 in conjunction with the dual CDI compatibility of radio 10 will be better appreciated by reference to FIGS. 4A, 4B, 5A and 5B showing various display conditions as could be encountered when receiving either VOR or localizer signals.

Turning first to the VOR feature, and with reference to FIGS. 4A and 4B, the keys of keyboard 48 are selectively actuated to tune radio 10 to a VOR frequency (e.g., 108.00 MHz), which frequency will be displayed in display section 50A (defined by the bottom right quadrant of display 50 as seen in FIG. 4A). Upon receipt of the VOR signals at that frequency, the current radial in which the aircraft (not shown) is headed will be determined by VOR circuit 78 and will be displayed along with a to/from indicator (a "T" or an "F", respectively) in display section 50B (defined at the bottom left quadrant of display 50 as seen in FIG. 4A). A different radial may be selected by actuation of OBS key 84 and actuation of numbered keys on keyboard 48 corresponding to the desired radial.

Display section 50C extends across the top half of display 50 as a horizontal bar graph 100 for displaying the degrees off the radial, i.e., CDI. The degrees off the radial is graphically represented by the bar graph 100 wherein the center line 102 is identified as a vertical bar in the center of the horizontal bar graph 100 and surrounded by a circle 104. Each bar or divider 106 to either side of centerline bar 104 represents, in the VOR situation, 2° off the radial with the first 2° marker being the left and right arcuate edges 108 of circle 104. A thick indicator bar 110 indicates the actual degrees off the radial. Thus, when the VOR signal is first received, indicator bar 110 should be coincident with center line 102 to indicate 0° from the radial. Thereafter, as the aircraft moves off the displayed radial, indicator bar 110 will appear to "move" to the appropriate location in graph 100 thus simulating the nav-head CDI meter function. Similarly, if a different radial is selected at keyboard 48, the new radial will be displayed in display portion 50B, and the indicator bar 110 will move to the proper location in display 50C to indicate degrees off of the selected radial. Consequently, it will be appreciated that radio 10 provides an OBS function to simulate the nav-head OBS dial. By way of example, FIG. 4A shows the output from display 50 when radio 10 is tuned to VOR frequency 108.00 MHz, the radial is 240° "to" the VOR station, and the aircraft is 6° off to the left of that radial (i.e., the aircraft must now come right to be on course). A similar example is shown in FIG. 4B but with bar 110 repositioned like a moving needle to indicate that the aircraft is 2° off to the right of the radial (and so the aircraft must come left).

Turning now to localizer signals and with reference to FIGS. 5A and 5B, when radio 10 is tuned to a localizer frequency (e.g., 108.10 MHz), the frequency is again displayed in section 50A of display 50 as seen in FIG. 5A. Also, the letters LOC are displayed in section 50B of display 50 to thus advise the pilot (not shown) that radio 10 is receiving a localizer signal. Bar graph 100 again provides useful CDI information but now with each divider bar (106) corresponding to 1° deviation from the localizer track. By way of example, FIG. 5A shows the output from display 50 when radio 10 is tuned to localizer frequency 108.10 MHz with the aircraft being 1½° to the right of the localizer track (i.e., the aircraft must now come left by an amount to recapture the center of the localizer). A similar example is shown in FIG. 5B with the aircraft being 1½° to the left of the localizer track (so the aircraft must come right). As will be readily appreciated, when making a back course approach, the positioning of indicator bar 110 will be in a reverse sense.

In use, antenna jack 38 is connected, for example, to an antenna 39 and radio 10 turned on by operation of switch 36 which causes on/off switch 36A to close. A desired frequency is selected and entered at keyboard 48. The selected frequency is latched into station select circuit 60 and communicated to the RF UP and RF DOWN circuits 62 and 64. The selected frequency is also conveyed as driver signals to display portion 50A whereat the selected frequency is displayed in a conventional manner. If the selected frequency is neither a VOR nor a localizer frequency, operation of radio 10 will be in conventional manner with use of push-to-talk switch 46 such that when switch 46 is not activated, aviation airband COMM signals may be received at antenna 39 and produce audio signals through speaker port 49. When push-to-talk switch 46 is actuated, audio signals received at microphone 70 will be modulated by RF UP circuit 62 and transmitted as RF signals in the airband by antenna 39. Volume of the audible signal from speaker port 49 may be adjusted by use of volume switch 36. Also, quieting of the radio may be adjusted by adjusting squelch control 34.

If the selected frequency is a VOR frequency, the current radial will be displayed with the appropriate to/from indicator in display section 50B. A different radial may be entered by actuation of OBS key 84 and selection of the three digits of the new radial. That new selected radial and appropriate to/from indication will be shown in display section 50B. Also, the VOR circuit 78 will compute the bearing information to determine the degrees off the radial, which information will then be conveyed to display portion 50C to drive indicator bar 110 to the appropriate location in the horizontal bar graph 100 to indicate the degrees off radial in a graphical and digital manner simulating a meter needle of a conventional nav-head. Where the frequency selected is a localizer frequency, LOC circuit 80 will be activated and display portion 50B will be caused to display the letters LOC if there are localizer signals received. Also, LOC circuit 80 will compute the deviation from the localizer track and convey the result of that computation to display portion 50C to drive indicator bar 110 to the appropriate location on horizontal bar graph 100 corresponding to the degrees deviation from the localizer track thus again simulating meter operation in a nav-head. The pilot (not shown) may use the CDI information provided in either the VOR signal receiving mode or the localizer signal receiving mode of radio 10 by which to guide the aircraft during in-flight operation (with respect to VOR signals) and for landing the aircraft (with respect to localizer signals).

Although shown as separate and discrete circuit components, various aspects of station select 60, VOR circuit 78 and LOC circuit 80 may be provided by one or more microprocessors appropriately programmed to drive the remaining portions of circuitry 30 and make the necessary CDI computations for both VOR and LOC signal operation and to provide the output driving signals to the various portions of display 50. In this regard, the actual computations and algorithms used to determine bearing and CDI are conventional and may be implemented in known fashion.

By virtue of the foregoing, there is thus provided a hand-held navigation radio communication transceiver with dual CDI capability to provide useful CDI information to pilots for both VOR and localizer purposes.

While the present invention has been illustrated by the description of an embodiment thereof, and while the embodiment has been described in considerable detail, it is not intended to restrict or in any way limit the scope of the appended claims to such detail. Additional advantages and modifications will readily appear to those skilled in the art. For example, display 50 could display section 50C (with the CDI bar graph 100 and related divider bars 106, indicator bar 110 and the like), while all the other data is provided in other displays. Bar graph 100 could also be replaced with other comparable graphic display representations. Additionally, display 50 (and keyboard 48) may be selectively lit for nighttime or dark cabin condition viewing as is known in the art (such as by actuation of button 120 provided on left wall 18 of housing portion 32).

Further, when tuned to receive NAV signals, radio 10 may be utilized to transmit signals at the Flight Service Station Frequency (122.100 MHz) upon actuation of PTT switch 46. The invention in its broader aspects is therefore not limited to the specific details, representative apparatus and methods and illustrative examples shown and described. Accordingly, departures may be made from such details without departing from the spirit or scope of the general inventive concept.

Having described the invention, what is claimed is:

1. A hand-held aviation airband navigation radio having a housing sized to be held in one hand while in use, a battery pack associated with the housing, a keyboard associated with the housing to facilitate tuning the radio to an RF frequency in the aviation airband, and circuitry associated with the housing and operatively coupled to the keyboard and the battery pack to facilitate electronic communication on the tuned RF frequency, the circuitry including circuit means for determining one of (a) degrees off a radial when the radio is tuned to an aviation airband frequency corresponding to a VOR frequency, and (b) deviation from a localizer track when the radio is tuned to an aviation airband frequency corresponding to a localizer frequency, the radio further including display means carried by the housing and coupled to the circuit means for digitally displaying in a graphical manner a course deviation indicator (CDI) corresponding to one of the degrees off a radial and deviation from a localizer track responsive to when the radio is tuned to one of the VOR frequency and the localizer frequency, respectively.

2. The hand-held navigation radio of claim 1 wherein the circuitry includes channel means for outputting signals corresponding to the aviation airband frequency to which the radio is tuned, the radio including further display means responsive to the channel means for digitally displaying the aviation airband frequency to which the radio is tuned.

3. The hand-held navigation radio of claim 2 wherein the first-mentioned and further display means are part of a common display.

4. The hand-held navigation radio of claim 1 wherein the circuit means includes radial means for outputting signals corresponding to the radial, the radio including further display means responsive to the radial means for digitally displaying the radial when the radio is tuned to the VOR frequency.

5. The hand-held navigation radio of claim 4 wherein the first-mentioned and further display means are part of a common display.

6. The hand-held navigation radio of claim 1 wherein the circuit means includes localizer means for outputting a signal indicating that the radio is tuned to the localizer frequency, the radio including further display means responsive to the localizer means for digitally displaying an indicator that the radio is tuned to the localizer frequency.

7. The hand-held navigation radio of claim 6 wherein the first-mentioned and further display means are part of a common display.

8. The hand-held navigation radio of claim 6 wherein the further display means digitally displays LOC as the indicator that the radio is tuned to the localizer frequency.

9. The hand-held navigation radio of claim 1 wherein the display means includes a horizontal bar graph and an indicator which graphically provides CDI.

10. The hand-held navigation radio of claim 9 wherein the horizontal bar graph includes a plurality of spaced vertical dividers, one of which is a center line with spacing between dividers corresponding to a predetermined amount of degrees off a radial or deviation from a localizer track, with 0° corresponding to the center line.

11. The hand-held navigation radio of claim 10 wherein the horizontal bar graph includes a circular indicator about the center line and having left and right arcuate edges which define some of the vertical dividers.

12. A hand-held aviation airband navigation radio having a housing sized to be held in one hand while in use, a battery pack associated with the housing, a keyboard associated with the housing to facilitate tuning the radio to an RF frequency in the aviation airband, and circuitry associated with the housing and operatively coupled to the keyboard and the battery pack to facilitate electronic communication on the tuned RF frequency, the circuitry including means for tuning the radio to a selected frequency in the aviation airband, transceiver means for voice communication when the radio is turned to a COMM frequency in the aviation airband and circuit means for determining one of (a) degrees off a radial when the radio is tuned to an aviation airband frequency corresponding to a VOR frequency, and (b) deviation from a localizer track when the radio is tuned to an aviation airband frequency corresponding to a localizer frequency, the radio further including display means carried by the housing and coupled to (i) the means for tuning for digitally displaying the selected frequency and (ii) circuit means for digitally displaying in a graphical manner a course deviation indicator (CDI) corresponding to one of the degrees off a radial and deviation from a localizer track responsive to when the radio is tuned to one of the VOR frequency and the localizer frequency, respectively.

* * * * *